(12) United States Patent
Yang

(10) Patent No.: US 11,687,447 B1
(45) Date of Patent: Jun. 27, 2023

(54) METHOD AND APPARATUS FOR PERFORMING ACCESS CONTROL OF MEMORY DEVICE WITH AID OF ADDITIONAL PHYSICAL ADDRESS INFORMATION

(71) Applicant: Silicon Motion, Inc., Hsinchu County (TW)

(72) Inventor: Tsung-Chieh Yang, Hsinchu (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 17/568,690

(22) Filed: Jan. 4, 2022

(51) Int. Cl.
*G06F 12/02* (2006.01)
*G06F 3/06* (2006.01)

(52) U.S. Cl.
CPC .......... *G06F 12/0246* (2013.01); *G06F 3/064* (2013.01); *G06F 3/0604* (2013.01); *G06F 3/0659* (2013.01); *G06F 3/0679* (2013.01); *G06F 12/0253* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 8,954,646 B2* | 2/2015 | Chen | G06F 12/0246 711/115 |
| 2008/0307192 A1 | 12/2008 | Sinclair | |
| 2014/0365711 A1* | 12/2014 | Makida | G06F 12/0253 711/103 |
| 2019/0018788 A1* | 1/2019 | Yoshida | G06F 12/1009 |
| 2021/0011845 A1* | 1/2021 | Huang | G06F 12/0246 |
| 2021/0081327 A1* | 3/2021 | Yamaguchi | G06F 12/0253 |
| 2022/0334730 A1* | 10/2022 | Srimal | G06F 3/0619 |

FOREIGN PATENT DOCUMENTS

| | | | |
|---|---|---|---|
| TW | 201729099 A | 8/2017 | |
| TW | 201915751 A | 4/2019 | |

* cited by examiner

*Primary Examiner* — Kevin Verbrugge
(74) *Attorney, Agent, or Firm* — Winston Hsu

(57) ABSTRACT

A method and apparatus for performing access control of a memory device with aid of additional physical address information are provided. The method includes: during a garbage collection procedure, reading valid data from a source block and writing the valid data into a destination block; updating at least one logical-to-physical address mapping table; receiving a first read request from a host device, wherein the first read request indicates reading at a first logical address; in response to the first read request, reading the valid data of the destination block according to the second physical address associated with the first logical address; receiving a second read request from the host device, wherein the second read request indicates reading at the first logical address; and in response to the second read request, reading the valid data of the source block according to the first physical address associated with the first logical address.

11 Claims, 8 Drawing Sheets

|          | (BLK#, PG#) | (BLK#, PG#) |
|----------|-------------|-------------|
| 0        | (0,0)       |             |
| 1        |             |             |
| 2        | (6,0)       | (256,0)     |
| 3        | (6,1)       |             |
| ⋮        | ⋮           |             |
| 16       | (11,3)      |             |
| 17       | (0,1)       |             |
| ⋮        | ⋮           |             |
| 117      | (0,2)       |             |
| ⋮        | ⋮           |             |

LPA ↓

LBLK#0 L2P table — TBL(0)

FIG. 6

|          | (BLK#, PG#) | (BLK#, PG#) |
|----------|-------------|-------------|
| 0        | (0,0)       |             |
| 1        |             |             |
| 2        | (6,0)       | (256,0)     |
| 3        | (6,1)       |             |
| ⋮        | ⋮           |             |
| 16       | (11,3)      | (256,1)     |
| 17       | (0,1)       |             |
| ⋮        | ⋮           |             |
| 117      | (0,2)       |             |
| ⋮        | ⋮           |             |
| 1117     | (256,17)    |             |
| ⋮        | ⋮           |             |

LPA ↓

LBLK#0 L2P table — TBL(0)

FIG. 7

METHOD AND APPARATUS FOR PERFORMING ACCESS CONTROL OF MEMORY DEVICE WITH AID OF ADDITIONAL PHYSICAL ADDRESS INFORMATION

BACKGROUND OF THE INVENTION

1. Field of the Invention

The present invention is related to memory control, and more particularly, to a method for performing access control of a memory device with aid of additional physical address information (e.g. an additional physical address associated with a logical address within at least one logical-to-physical (L2P) address mapping table), and associated apparatus such as the memory device, a memory controller thereof, etc.

2. Description of the Prior Art

Developments in memory technology have enabled the wide application of various portable or non-portable memory devices, such as memory cards respectively conforming to the SD/MMC, CF, MS and XD specifications, and embedded memory devices respectively conforming to the UFS and eMMC specifications. Improving access control of these memory devices remains an issue to be solved in the art.

NAND flash memories may comprise single level cell (SLC) and multiple level cell (MLC) flash memories. In an SLC flash memory, each transistor used as a memory cell may store either of two electrical charge values respectively corresponding to logic values 0 and 1. In comparison, the storage ability of each transistor used as a memory cell in an MLC flash memory may be fully utilized. The transistor in the MLC flash memory can be driven by a voltage higher than that in the SLC flash memory, and different voltage levels can be utilized to record information of at least two bits (e.g. 00, 01, 11, or 10). In theory, the recording density of the MLC flash memory may reach at least twice the recording density of the SLC flash memory, and is therefore preferred by manufacturers of NAND flash memories.

The lower cost and larger capacity of the MLC flash memory means it is more likely to be applied in memory devices than an SLC flash memory. The MLC flash memory does have instability issues, however. To ensure that access control of the flash memory in the memory device meets required specifications, a controller of the flash memory may be equipped with some management mechanisms for properly managing data access.

Even memory devices with the above management mechanisms may have certain deficiencies, however. For example, a high capacity architecture having a number of Flash memory dies may have been managed via multiple channels, to try reducing the impact of read collision. When it is needed to perform a random read test to obtain a test result that meet an enterprise-class requirement, the issue of read collision may become much more severe for a higher capacity architecture having a greater number of Flash memory dies.

Thus, there is a need for a novel method and associated architecture to solve the problems of the related art without introducing any side effect or in a way that is less likely to introduce side effects.

SUMMARY OF THE INVENTION

An objective of the present invention is to provide a method for performing access control of a memory device with aid of additional physical address information, and to provide an associated apparatus such as the memory device, a controller thereof, etc., to solve the problems mentioned above.

At least one embodiment of the present invention provides a method for performing access control of a memory device with aid of additional physical address information, wherein the method is applied to a controller of the memory device. The memory device may comprise the controller and a non-volatile (NV) memory, and the NV memory may comprise a plurality of NV memory elements. The method may comprise: during a garbage collection procedure, reading valid data from a source block and writing the valid data of the source block into a destination block to be valid data of the destination block, wherein the source block and the destination block represent a first physical block within a first NV memory element of the plurality of NV memory elements and a second physical block within a second NV memory element of the plurality of NV memory elements, respectively; updating at least one logical-to-physical (L2P) address mapping table to make the at least one L2P address mapping table comprise both of a first physical address associated with a first logical address and a second physical address associated with the first logical address, wherein the first physical address indicates where the valid data of the source block is stored within the first physical block, and the second physical address indicates where the valid data of the destination block is stored within the second physical block; receiving a first read request from a host device, wherein the first read request indicates reading at the first logical address; in response to the first read request, reading the valid data of the destination block according to the second physical address associated with the first logical address; receiving a second read request from the host device, wherein the second read request indicates reading at the first logical address; and in response to the second read request, reading the valid data of the source block according to the first physical address associated with the first logical address.

In addition to the method mentioned above, the present invention also provides a memory device, and the memory device comprises an NV memory and a controller. The NV memory is configured to store information, wherein the NV memory may comprise a plurality of NV memory elements. The controller is coupled to the NV memory, and the controller is configured to control operations of the memory device. In addition, the controller comprises a processing circuit, wherein the processing circuit is configured to control the controller according to a plurality of host commands from a host device, to allow the host device to access the NV memory through the controller. For example, during a garbage collection procedure, the controller reads valid data from a source block and writes the valid data of the source block into a destination block to be valid data of the destination block, wherein the source block and the destination block represent a first physical block within a first NV memory element of the plurality of NV memory elements and a second physical block within a second NV memory element of the plurality of NV memory elements, respectively; the controller updates at least one logical-to-physical (L2P) address mapping table to make the at least one L2P address mapping table comprise both of a first physical address associated with a first logical address and a second physical address associated with the first logical address, wherein the first physical address indicates where the valid data of the source block is stored within the first physical block, and the second physical address indicates where the valid data of the destination block is stored within the second physical block; the controller receives a first read request from the host device, wherein the first read request indicates reading at the first logical address, and the first read request comprises a first read command among the plurality of host commands; in response to the first read request, the controller reads the valid data of the destination block according to the second physical address associated with the first logical address; the controller receives a second read request from the host device, wherein the second read request indicates reading at the first logical address, and the second read request comprises a second read command among the plurality of host commands; and in response to the second read request, the controller reads the valid data of the source block according to the first physical address associated with the first logical address.

In addition to the method mentioned above, the present invention also provides a controller of a memory device, wherein the memory device comprises the controller and an NV memory. The NV memory may comprise a plurality of NV memory elements. In addition, the controller comprises a processing circuit, wherein the processing circuit is configured to control the controller according to a plurality of host commands from a host device, to allow the host device to access the NV memory through the controller. For example, during a garbage collection procedure, the controller reads valid data from a source block and writes the valid data of the source block into a destination block to be valid data of the destination block, wherein the source block and the destination block represent a first physical block within a first NV memory element of the plurality of NV memory elements and a second physical block within a second NV memory element of the plurality of NV memory elements, respectively; the controller updates at least one logical-to-physical (L2P) address mapping table to make the at least one L2P address mapping table comprise both of a first physical address associated with a first logical address and a second physical address associated with the first logical address, wherein the first physical address indicates where the valid data of the source block is stored within the first physical block, and the second physical address indicates where the valid data of the destination block is stored within the second physical block; the controller receives a first read request from the host device, wherein the first read request indicates reading at the first logical address, and the first read request comprises a first read command among the plurality of host commands; in response to the first read request, the controller reads the valid data of the destination block according to the second physical address associated with the first logical address; the controller receives a second read request from the host device, wherein the second read request indicates reading at the first logical address, and the second read request comprises a second read command among the plurality of host commands; and in response to the second read request, the controller reads the valid data of the source block according to the first physical address associated with the first logical address.

The method and the associated apparatus provided by the present invention can ensure that the memory device can properly operate under various situations, where examples of the apparatus mentioned above comprise: the controller, the memory device, etc. In addition, by using the additional physical address information, the method and the associated apparatus provided by the present invention can ensure real-time response from the memory device to the host device, and therefore can improve the overall performance.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 illustrates some physical addresses recorded based on the L2P address mapping control scheme shown in FIG. 4 according to another embodiment of the present invention.

FIG. 7 illustrates some physical addresses recorded based on the L2P address mapping control scheme shown in FIG. 4 according to yet another embodiment of the present invention.

DETAILED DESCRIPTION

Figure 1:
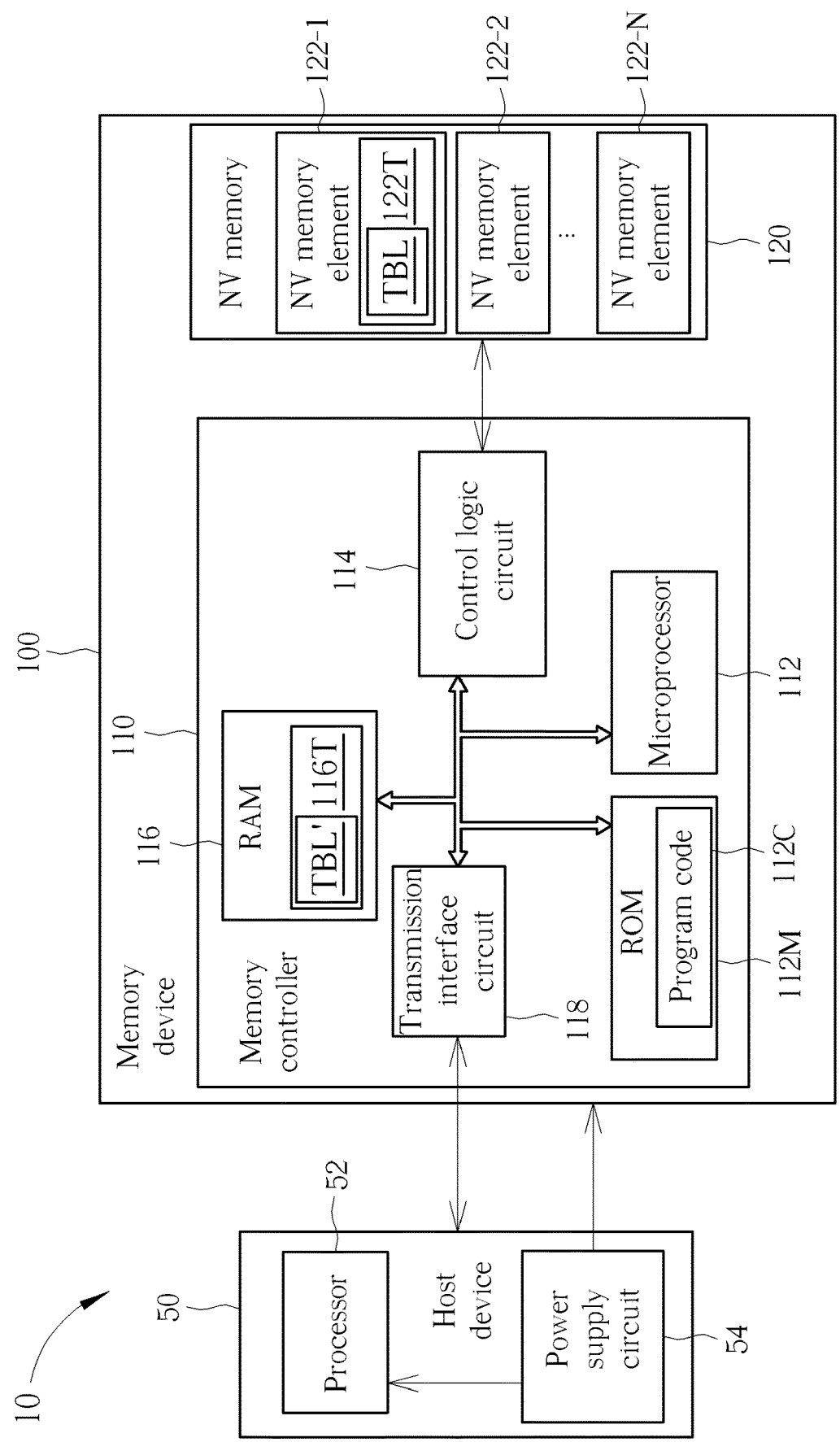
FIG. 1 is a diagram of an electronic device according to an embodiment of the present invention.

FIG. 1 is a diagram of an electronic device 10 according to an embodiment of the present invention, wherein the electronic device 10 may comprise a host device 50 and a memory device 100. The host device 50 may comprise at least one processor (e.g. one or more processors), which may be collectively referred to as a processor 52, and the host device 50 may further comprise a power supply circuit 54, coupled to the processor 52. The processor 52 is arranged to control operations of the host device 50, and the power supply circuit 54 is arranged to provide power to the processor 52 and the memory device 100, and output one or more driving voltages to the memory device 100. The memory device 100 can be arranged to provide the host device 50 with storage space, and the one or more driving voltages can be obtained from the host device 50 to be used as the power source of the memory device 100. Examples of the host device 50 may comprise (but are not limited to) multifunctional mobile phone, wearable device, tablet, and personal computer such as desktop computer and laptop computer. Examples of the memory device 100 may comprise (but are not limited to) portable memory devices (e.g. memory cards conforming to SD/MMC, CF, MS, or XD specification), solid state drives (SSD), and various embedded memory devices respectively conforming to UFS and EMMC specification. According to the embodiment, the memory device 100 may comprise a controller such as a memory controller 110, and may further comprise a non-volatile (NV) memory 120, wherein the controller is arranged to control operations of the memory device 100 and access the NV memory 120, and the NV memory 120 is arranged to store information. The NV memory 120 may comprise at least one NV memory element (e.g. one or more NV memory elements), such as a plurality of NV memory elements 122-1, 122-2, . . . and 122-N, wherein the symbol "N" can represent a positive integer greater than one. For example, the NV memory 120 may be a flash memory, and the plurality of NV memory elements 122-1, 122-2, . . . and 122-N may be a plurality of flash memory chips or a plurality of flash memory dies, but the invention is not limited thereto.

As shown in FIG. 1, the memory controller 110 may comprise a processing circuit such as a microprocessor 112, a storage unit such as a read-only memory (ROM) 112M, a control logic circuit 114, a random access memory (RAM) 116, and a transmission interface circuit 118, wherein the above elements can be coupled to each other through a bus. The RAM 116 is implemented by a static random access memory (SRAM), but the invention is not limited thereto. The RAM 116 can be arranged to provide the memory controller 110 with internal storage space. For example, the RAM 116 can be used as a buffer memory to buffer data. In addition, the ROM 112M of the embodiment is arranged to store a program code 112C, and the microprocessor 112 is arranged to execute the program code 112C to control access to the NV memory 120. Please note that, in some examples, the program code 112C can be stored in the RAM 116 or any form of memory. In addition, a data protection circuit (not shown) in the control logic circuit 114 can protect data and/or perform error correction, and the transmission interface circuit 118 can conform to a specific communications specification such as Serial Advanced Technology Attachment (SATA) specification, Universal Serial Bus (USB) specification, Peripheral Component Interconnect Express (PCIe) specification, embedded Multi-Media Card (eMMC) specification, or Universal Flash Storage (UFS) specification, and can perform communications according to the specific communications specification.

In the embodiment, the host device 50 can access the memory device 100 by sending host commands and corresponding logical addresses to the memory controller 110. The memory controller 110 receives the host commands and the logical addresses, and translates the host commands into memory operation commands (which may be simply called operation commands), and then controls the NV memory with the operation commands to perform reading, writing/programing, etc. on memory units (e.g. data pages) with physical addresses in the NV memory 120, wherein the physical addresses can be associated with the logical addresses. When the memory controller 110 performs an erase operation on any NV memory element 122-n among the plurality of NV memory elements 122-1, 122-2, . . . and 122-N (the symbol "n" can represent any integer in the interval [1, N]), at least one of multiple blocks of the NV memory device 122-n will be erased, wherein each block in the multiple blocks can comprise multiple pages (e.g. data pages), and an access operation (e.g. reading or writing) can be performed on one or more pages.

According to some embodiments, the processing circuit such as the microprocessor 112 can control the memory controller 110 according to a plurality of host commands from the host device 50, to allow the host device 50 to access the NV memory 120 through the memory controller 110. The memory controller 110 can store data into the NV memory 120 for the host device 50, read the stored data in response to a host command from the host device 50 (e.g. one of the plurality of host commands), and provide the host device 50 with the data read from the NV memory 120. In the NV memory 120 such as the flash memory, the aforementioned at least one NV memory element (e.g. the plurality of NV memory elements 122-1, 122-2, . . . and 122-N) may comprise a plurality of blocks such as a first set of physical blocks in the NV memory element 122-1, a second set of physical blocks in the NV memory element 122-2, . . . and an $Nt^{th}$ set of physical blocks in the NV memory element 122-N. The memory controller 110 can be designed to properly manage the plurality of blocks such as these sets of physical blocks.

More particularly, the plurality of blocks such as these sets of physical blocks may comprise a plurality of data blocks (e.g. a plurality of valid blocks storing valid data) and a plurality of spare blocks (e.g. a plurality of blank blocks such as erased blocks, and a plurality of invalid blocks storing valid data and/or invalid data, such as blocks that can be erased but have not been erased). The memory controller 110 can perform block management on the plurality of data blocks and the plurality of spare blocks. For example, the memory controller 110 can select a blank block from the plurality of blank blocks and change this blank block to be a new member of the plurality of data blocks, such as a new data block for performing data writing. In response to a write request for writing data at a certain logical address, the memory controller 110 can write the data at a first location within the NV memory 120, such as a physical address associated with this logical address. In response to another write request for writing data at the same logical address, the memory controller 110 can write the data at a second location within the NV memory 120, such as another physical address associated with this logical address, and determine that the data at the first location within the NV memory 120 becomes invalid data. In addition, the memory controller 110 can trigger a garbage collection procedure to discard invalid data in one or more data blocks among the plurality of data blocks and make valid data in the one or more data blocks be stored together somewhere else, and more particularly, select one or more blank blocks from the plurality of blank blocks and change the one or more blank blocks to be one or more new members of the plurality of data blocks, such as one or more new data blocks, copy the valid data from the one or more data blocks into the one or more new data blocks, and change the one or more data blocks to be one or more new members of the plurality of spare blocks, such as one or more new spare blocks, in order to prepare more blank blocks by erasing the one or more new spare blocks, for further storing new data.

The memory controller 110 can record, maintain, and/or update block management information regarding the block management in at least one table such as a table 116T and a table 122T, where the table 116T may comprise a temporary version of at least a portion (e.g. a part or all) of the table 122T. For example, the table 122T may comprise at least one logical-to-physical (L2P) address mapping table (e.g. one or more L2P address mapping tables), which may be collectively referred to as the L2P table TBL, for recording mapping relationships between logical addresses and physical addresses, and the table 116T may comprise a temporary version of at least one sub-table (e.g. one or more sub-tables) of the L2P table TBL, where the temporary version of the aforementioned at least one sub-table may be collectively referred to as the L2P table TBL', but the invention is not limited thereto. For example, the table 122T may further comprise at least one spare block management table (e.g. one or more spare block management tables) for managing the plurality of spare blocks, such as a blank block management table and an invalid block management table for respectively managing the plurality of blank blocks and the plurality of invalid blocks, and the table 116T may comprise a temporary version of the aforementioned at least one spare block management table, such as a temporary version of the blank block management table and a temporary version of the invalid block management table.

The memory controller 110 can back up the table 116T to the table 122T in the NV memory 120 (e.g. one or more NV memory elements in the plurality of NV memory elements 122-1, 122-2, . . . and 122-N), and the memory controller 110 may load at least a portion (e.g. a part or all) of the table 122T into the RAM 116 to become the table 116T for quick reference, where the table 122T can be illustrated in a certain NV memory element such as the NV memory element 122-1 to indicate that the table 122T can be stored in the NV memory element 122-1, but the invention is not limited thereto. According to some embodiments, the table 122T can be divided into multiple portions for being stored in two or more NV memory elements among the plurality of NV memory elements 122-1, 122-2, . . . and 122-N, and the table 122T can be illustrated as the multiple portions respectively stored in the two or more NV memory elements.

Figure 2A:
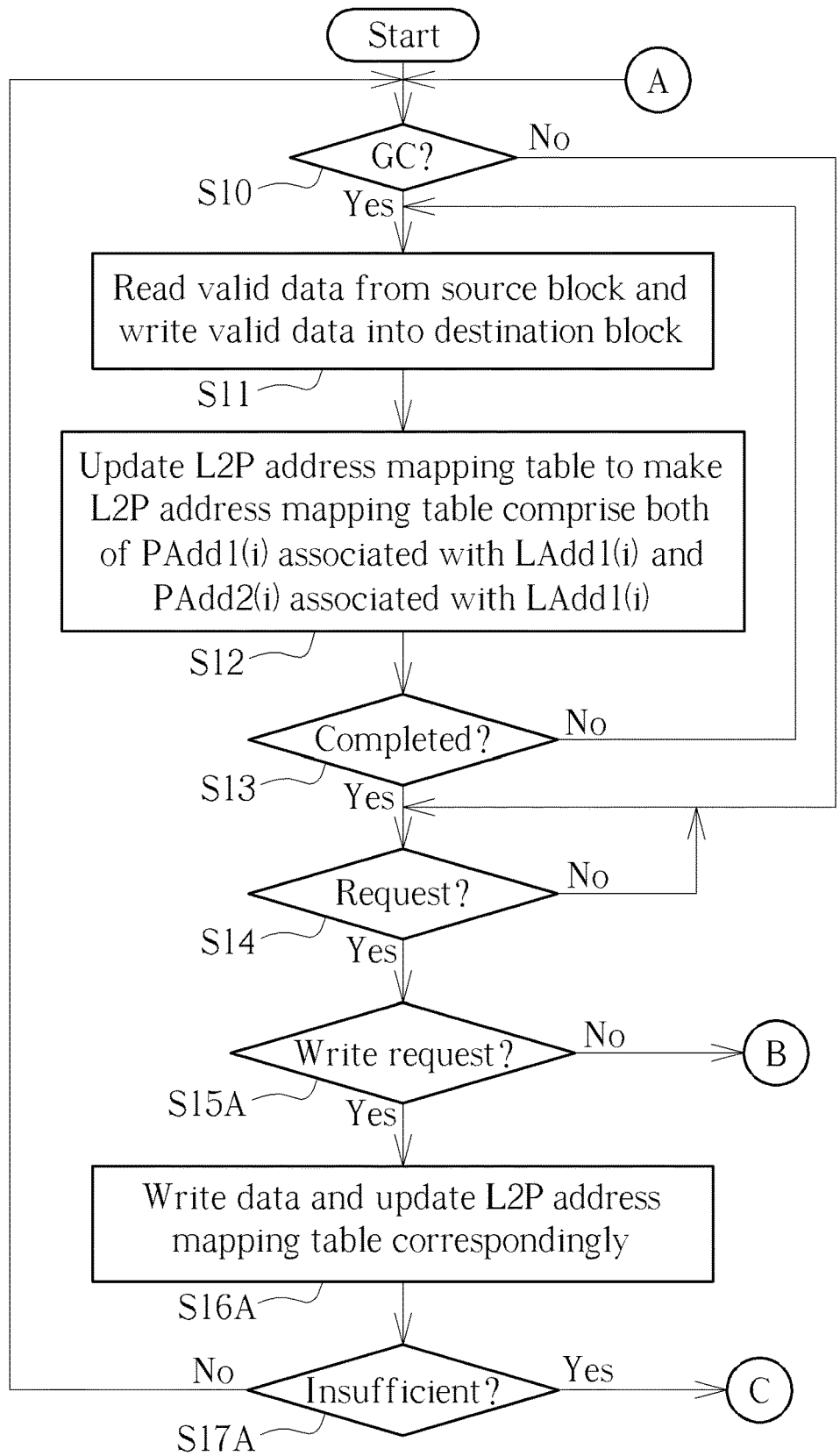
FIG. 2A illustrates a first portion of a flowchart of a method for performing access control of a memory device such as that shown in FIG. 1 with aid of additional physical address information according to an embodiment of the present invention.
Figure 2B:
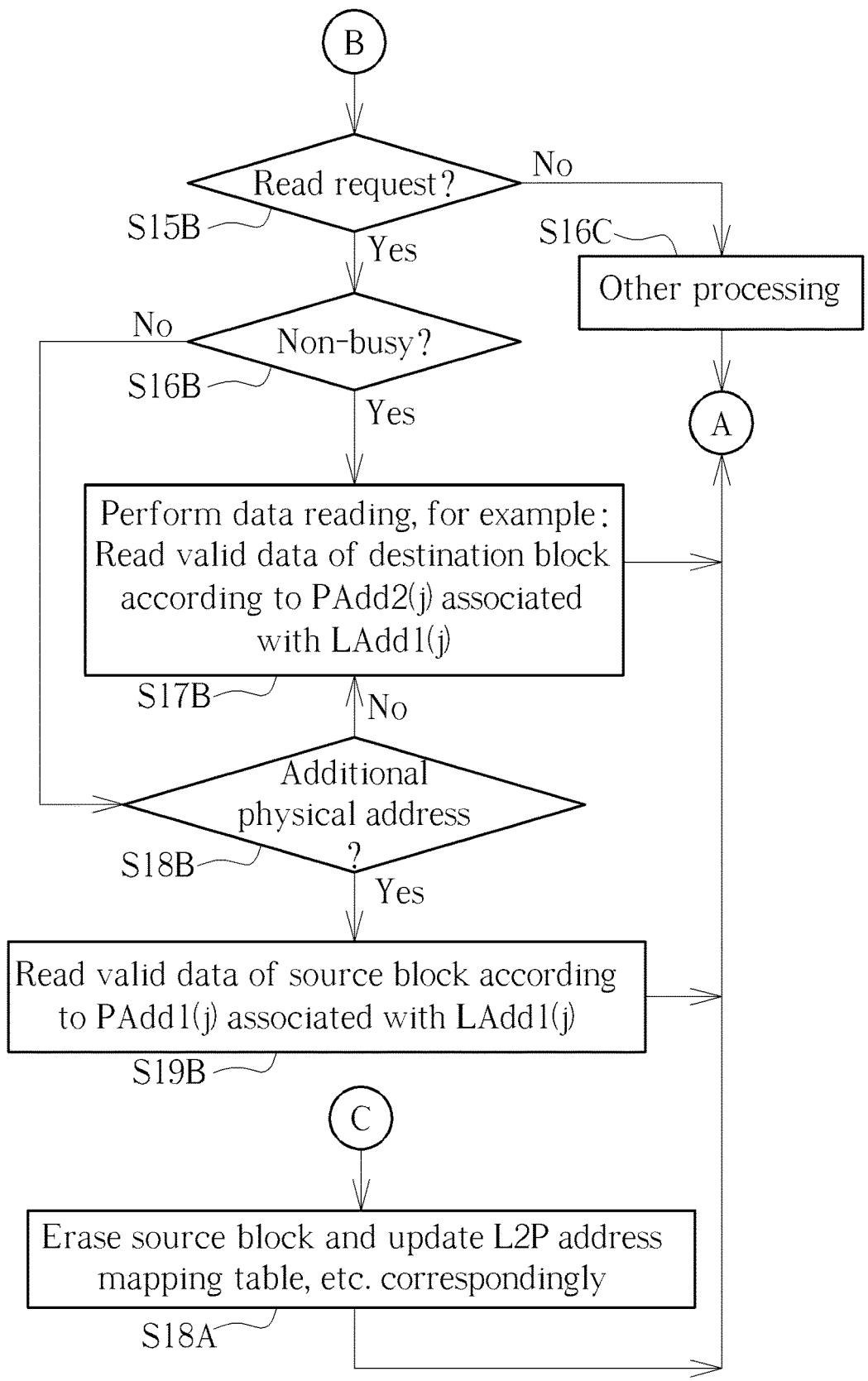
FIG. 2B illustrates a second portion of the flowchart of the method for performing the access control of the memory device with aid of the additional physical address information.

FIG. 2A and FIG. 2B respectively illustrate a first portion and a second portion of a flowchart of a method for performing access control of a memory device such as that shown in FIG. 1 with aid of additional physical address information according to an embodiment of the present invention, where the nodes A, B and C may indicate the connections between respective partial working flows of FIG. 2A and FIG. 2B. The method can be applied to the architecture shown in FIG. 1 (e.g. the electronic device 10, the memory device 100, the memory controller 110, and the microprocessor 112), and can be executed by the memory controller 110 (e.g. the microprocessor 112) of the memory device 100.

In Step S10, the memory controller 110 (e.g. the microprocessor 112) can determine whether to trigger the garbage collection procedure (labeled "GC" for brevity). If Yes, Step S11 is entered; if No, Step S14 is entered.

For example, the memory controller 110 (e.g. the microprocessor 112) can determine whether to trigger the garbage collection procedure according to whether a spare block count of the plurality of spare blocks is less than a predetermined spare block count threshold, and more particularly, selectively perform one of the following operations:
(1) triggering the garbage collection procedure if the spare block count is less than the predetermined spare block count threshold; and
(2) preventing triggering the garbage collection procedure if the spare block count is greater than or equal to the predetermined spare block count threshold;
but the invention is not limited thereto. In another example, the memory controller 110 (e.g. the microprocessor 112) can determine whether to trigger the garbage collection procedure according to whether an invalid block count of the plurality of invalid blocks is less than a predetermined invalid block count threshold, and more particularly, selectively perform one of the following operations:
(1) triggering the garbage collection procedure if the invalid block count is less than the predetermined invalid block count threshold; and
(2) preventing triggering the garbage collection procedure if the invalid block count is greater than or equal to the predetermined invalid block count threshold.

In Step S11, during the garbage collection procedure, the memory controller 110 (e.g. the microprocessor 112) can read valid data from a source block (e.g. any data block among the one or more data blocks) and write the valid data of the source block (e.g. the valid data stored in the source block, such as the valid data read from the source block) into a destination block (e.g. any new data block among the one or more new data blocks) to be the valid data of the destination block (e.g. the valid data stored in the destination block, such as the valid data that is just written into the destination block), where the source block and the destination block may represent a first physical block within a first NV memory element $122\text{-}n1$ of the plurality of NV memory elements 122-1, 122-2, . . . and 122-N and a second physical block within a second NV memory element $122\text{-}n2$ of the plurality of NV memory elements 122-1, 122-2, . . . and 122-N, respectively. For example, the symbols "$n1$" and "$n2$" may represent any two different integers in the interval [1, N], but the invention is not limited thereto. In some examples, additional limitation may be added to the selection of the first NV memory element $122\text{-}n1$ and the second NV memory element $122\text{-}n2$ among the plurality of NV memory elements 122-1, 122-2, . . . and 122-N.

In Step S12, the memory controller 110 (e.g. the microprocessor 112) can update the aforementioned at least one L2P address mapping table (e.g. at least one of the L2P tables TBL and TBL', such as both of the L2P tables TBL and TBL') to make the aforementioned at least one L2P address mapping table comprise both of a first physical address PAdd1(i) associated with a first logical address LAdd1(i) and a second physical address PAdd2(i) associated with the first logical address LAdd1(i), where the symbol "i" may represent a loop index of the loop comprising Steps S11-S13, for indicating that the set of addresses {LAdd1(i), PAdd1(i), PAdd2(i)} may vary with respect to the iterations (e.g. the $i^{th}$ iteration) of this loop.

For better comprehension, the first physical address PAdd1(i) may indicate where the valid data of the source block is stored within the first physical block, for example, a source location within the first NV memory element $122\text{-}n1$, such as a physical address indicating a first physical page in the first physical block. In addition, the second physical address PAdd2(i) may indicate where the valid data of the destination block is stored within the second physical block, for example, a destination location within the second NV memory element $122\text{-}n2$, such as a physical address indicating a second physical page in the second physical block.

In Step S13, the memory controller 110 (e.g. the microprocessor 112) can determine whether the garbage collection procedure is completed. If Yes, Step S14 is entered; if No, Step S11 is entered.

In Step S14, the memory controller 110 (e.g. the microprocessor 112) can determine whether a request (e.g. one of the plurality of host commands) is received from the host device 50. If Yes, Step S15A is entered; if No, Step S14 is entered.

In Step S15A, the memory controller 110 (e.g. the microprocessor 112) can determine whether the request mentioned in Step S14 (e.g. the request that is just received from the host device 50) is a write request. If Yes, Step S16A is entered; if No, Step S15B is entered.

In Step S16A, in response to the write request mentioned in Step S15A, the memory controller 110 (e.g. the microprocessor 112) can write data into the NV memory 120 and update the aforementioned at least one L2P address mapping table correspondingly.

In Step S17A, based on at least one predetermined rule, the memory controller 110 (e.g. the microprocessor 112) can determine whether the number of reusable spare blocks (e.g. the number of erased spare blocks) is insufficient. If Yes, Step S18A is entered; if No, Step S10 is entered.

For example, the memory controller 110 (e.g. the microprocessor 112) can determine whether the number of reusable spare blocks (e.g. the number of erased spare blocks) is insufficient according to whether a blank block count of the plurality of blank blocks is less than a predetermined blank block count threshold, and more particularly, selectively perform one of the following operations:
(1) determining that the number of available blank blocks is insufficient if the blank block count is less than the predetermined blank block count threshold; and
(2) determining that the number of available blank blocks is not insufficient if the blank block count is greater than or equal to the predetermined blank block count threshold; but the invention is not limited thereto.

In Step S18A, the memory controller 110 (e.g. the microprocessor 112) can erase at least one source block (e.g. one or more source blocks) of the garbage collection procedure, such as the source block mentioned in Step S11, and update the aforementioned at least one L2P address mapping table, etc. correspondingly. For example, the memory controller 110 (e.g. the microprocessor 112) can update the blank block management table to indicate that the aforementioned at least one source block that has just been erased is added to be at least one new member of the plurality of blank blocks, and update the invalid block management table to indicate that the aforementioned at least one source block that has just been erased is removed from the plurality of invalid blocks.

In Step S15B, the memory controller 110 (e.g. the microprocessor 112) can determine whether the request mentioned in Step S14 (e.g. the request that is just received from the host device 50) is a read request. If Yes, Step S16B is entered; if No, Step S16C is entered.

In Step S16B, the memory controller 110 (e.g. the microprocessor 112) can determine whether a target NV memory element to be read (e.g. the second NV memory element 122-n2 comprising the destination block) among the plurality of NV memory elements 122-1, 122-2, . . . and 122-N is non-busy. If Yes, Step S17B is entered; if No, Step S18B is entered.

For example, the read request mentioned in Step S15B may carry a target logical address, where the target logical address may indicate reading at the target logical address. The memory controller 110 (e.g. the microprocessor 112) can obtain a latest physical address associated with the target logical address from the aforementioned at least one L2P address mapping table. For better comprehension, the latest physical address may be pointing toward any destination block of the garbage collection procedure, and the target NV memory element to be read may represent the NV memory element comprising the any destination block, but the invention is not limited thereto.

In Step S17B, the memory controller 110 (e.g. the microprocessor 112) can perform data reading at the latest physical address, and more particularly, for the case that the latest physical address is pointing toward the any destination block of the garbage collection procedure, read the valid data of the any destination block (e.g. the destination block mentioned in Step S11) from the any destination block according to the second physical address PAdd2(j) associated with the first logical address LAdd1(j), where the symbol "j" may represent a possible value i0 of the loop index i of the loop comprising Steps S11-S13, for indicating that the set of addresses {LAdd1(j), PAdd1(j), PAdd2(j)} is a certain set of addresses {LAdd1(i0), PAdd1(i0), PAdd2(i0)} corresponding to the i0$^{th}$ iteration of this loop among all sets of addresses (e.g. multiple sets of addresses {{LAdd1(i), PAdd1(i), PAdd2(i)} |i=0, 1, . . . }) respectively corresponding to all iterations of this loop.

For better comprehension, the reading operation for the case that the latest physical address is pointing toward the any destination block can be taken as an example of the data reading performed in Step S17B, but the invention is not limited thereto. For the case that the latest physical address is not pointing toward the any destination block, the memory controller 110 (e.g. the microprocessor 112) can perform the data reading at the latest physical address, for example, read data from a target physical block (e.g. one or more physical pages thereof) indicated by the latest physical address.

In Step S18B, the memory controller 110 (e.g. the microprocessor 112) can determine whether an additional physical address associated with the target logical address (e.g. the first physical address PAdd1(j) associated with the first logical address LAdd1(j), such as the first physical address PAdd1(i0)) that is different from the latest physical address (e.g. the second physical address PAdd2(j) associated with the first logical address LAdd1(j), such as the second physical address PAdd2(i0)) exists in the aforementioned at least one L2P address mapping table. If Yes, Step S19B is entered; if No, Step S17B is entered.

For the case that the latest physical address is pointing toward the any destination block, for example, as long as the valid data at the additional physical address (e.g. the first physical address PAdd1(j) such as the first physical address PAdd1(i0)) has not been erased due to any erase operation (e.g. the erase operation of Step S18A), the memory controller 110 (e.g. the microprocessor 112) may keep the additional physical address in the aforementioned at least one L2P address mapping table, causing existence of the additional physical address, and therefore the determination result "Yes" of Step S18B will make Step S19B be entered. For another example, in a situation where the operation of Step S18A has been performed to make the valid data at the additional physical address (e.g. the first physical address PAdd1(j) such as the first physical address PAdd1(i0)) be erased, the memory controller 110 (e.g. the microprocessor 112) may have updated the aforementioned at least one L2P address mapping table to remove the additional physical address from the aforementioned at least one L2P address mapping table, causing non-existence of the additional physical address, and therefore the determination result "No" of Step S18B will make Step S17B be entered. Additionally, for the case that the latest physical address is not pointing toward the any destination block, as no additional physical address exists, the determination result "No" of Step S18B will make Step S17B be entered.

In Step S19B, the memory controller 110 (e.g. the microprocessor 112) can read the valid data of a certain source block (e.g. the source block mentioned in Step S11) from the source block according to the first physical address PAdd1(j) associated with the first logical address LAdd1(j).

For example, in a situation where the first logical address LAdd1(j) is equal to the first logical address LAdd1(i0), the any destination block may represent the destination block mentioned in Step S11 in the i0$^{th}$ iteration of the loop comprising Steps S11-S13, and more particularly, the second physical address PAdd2(j) associated with the first logical address LAdd1(j) as mentioned in Step S17B may represent the second physical address PAdd2(i) associated with the first logical address LAdd1(i0) as mentioned in Step S12 in the i0$^{th}$ iteration of this loop, such as the second physical address PAdd2(i0) associated with the first logical address LAdd1(i0), and the first physical address PAdd1(j) associated with the first logical address LAdd1(j) as mentioned in Step S19B may represent the first physical address PAdd1(i) associated with the first logical address LAdd1(i0) as mentioned in Step S12 in the i0$^{th}$ iteration of this loop, such as the first physical address PAdd1(i0) associated with the first logical address LAdd1(i0).

In Step S16C, in response to the request mentioned in Step S14 (e.g. the request that is just received from the host device 50), the memory controller 110 (e.g. the microprocessor 112) can perform other processing.

As a result of executing the garbage collection procedure (more particularly, the loop comprising Steps S11-S13), the memory controller 110 (e.g. the microprocessor 112) can make the source block mentioned in Step S19B be associated with the any destination block via recording both of the latest physical address (e.g. the second physical address PAdd2(j) such as the second physical address PAdd2(i0)) and the additional physical address (e.g. the first physical address PAdd1(j) such as the first physical address PAdd1(i0)) in the aforementioned at least one L2P address mapping table, and therefore the source block mentioned in Step S19B can be referred to as an associated source block of the any destination block.

As shown in FIG. 2A and FIG. 2B, the memory controller 110 (e.g. the microprocessor 112) can perform the access control of the memory device with aid of the additional physical address information, and more particularly, perform the following operations:

(1) receiving a first read request from the host device 50, where the first read request indicates reading at the first logical address LAdd1(j), and the first read request comprises a first read command among the plurality of host commands;

(2) in response to the first read request, reading the valid data of the any destination block (e.g. the destination block mentioned in Step S11) from the any destination block according to the second physical address PAdd2(j) associated with the first logical address LAdd1(j), as mentioned in Step S17B;

(3) receiving a second read request from the host device 50, where the second read request indicates reading at the first logical address LAdd1(j), and the second read request comprises a second read command among the plurality of host commands; and (4) in response to the second read request, reading the valid data of the associated source block (e.g. the source block mentioned in Step S11) from the associated source block according to the first physical address associated with the first logical address LAdd1(j), as mentioned in Step S19B; where both of the valid data of the any destination block and the valid data of the associated source block can be used as the valid data at the first logical address LAdd1(j).

For example, the memory controller 110 (e.g. the microprocessor 112) can maintain the blank block count to be much smaller than the invalid block count most of the time, and therefore, it is typical that, after completion of reading the valid data of the associated source block (e.g. the source block mentioned in Step S11) in response to the second read request, erasing the source block may occur without hindering the data reading regarding the associated source block.

As a result, the memory controller 110 can return any of the valid data of the any destination block and the valid data of the associated source block to the host device 50, to ensure real-time response from the memory device 100 to the host device 50, and therefore can improve the overall performance. For example, the memory controller 110 (e.g. the microprocessor 112) can read the valid data from the any destination block (e.g. the destination block mentioned in Step S11) first to obtain the valid data at the first logical address LAdd1(j) when the non-busy condition is satisfied (e.g. the determination result "Yes" of Step S16B), and can read the valid data from the associated source block (e.g. the source block mentioned in Step S11) to obtain the valid data at the first logical address LAdd1(j) when the non-busy condition is not satisfied (e.g. the determination result "No" of Step S16B), but the present invention is not limited thereto.

For better comprehension, the method may be illustrated with the working flow shown in FIG. 2A and FIG. 2B, but the present invention is not limited thereto. According to some embodiments, one or more steps may be added, deleted, or changed in the working flow shown in FIG. 2A and FIG. 2B. For example, it may be unnecessary that the memory controller 110 (e.g. the microprocessor 112) updates both of the L2P tables TBL and TBL' in Step S12 in each iteration of the loop comprising Steps S11-S13, and when it is determined in Step S13 that the garbage collection procedure is completed, before entering Step S14, the memory controller 110 (e.g. the microprocessor 112) can update the L2P table TBL according to the latest version of the L2P table TBL'.

According to some embodiments, the predetermined spare block count threshold can be equal to the summation of the predetermined invalid block count threshold and the predetermined blank block count threshold, but the invention is not limited thereto. In addition, regarding the tables 122T and 116T maintained by the memory controller 110, the source block can be recorded as an invalid block on the invalid block management table, for being erased based on the aforementioned at least one predetermined rule.

According to some embodiments, the memory controller 110 (e.g. the microprocessor 112) can read the valid data from the associated source block (e.g. the source block mentioned in Step S11) first to obtain the valid data at the first logical address LAdd1(j) when the non-busy condition is satisfied (e.g. the determination result "Yes" of Step S16B), and can read the valid data from the any destination block (e.g. the destination block mentioned in Step S11) to obtain the valid data at the first logical address LAdd1(j) when the non-busy condition is not satisfied (e.g. the determination result "No" of Step S16B).

Figure 3:
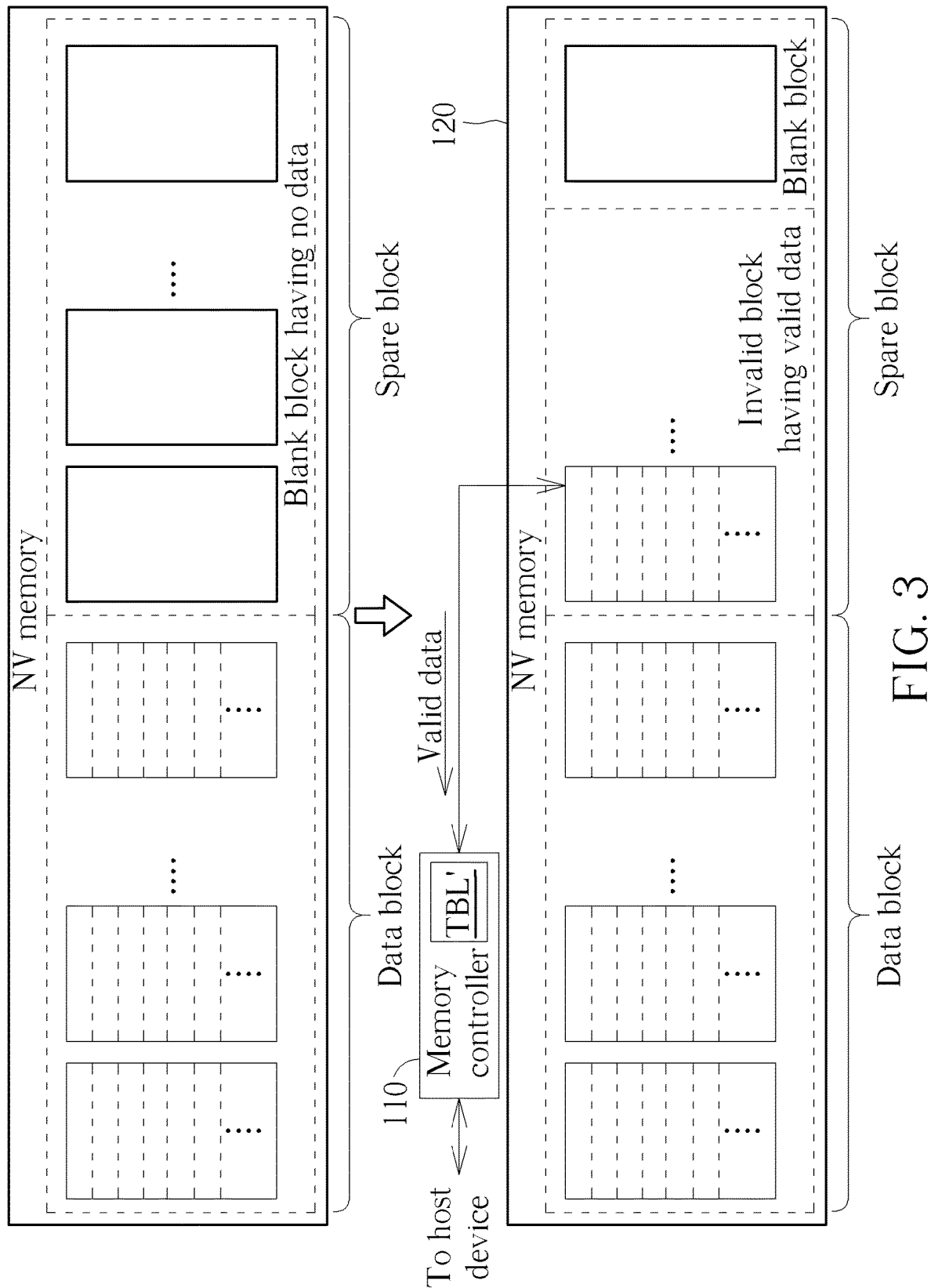
FIG. 3 illustrates, in the lower half thereof, an access control scheme of the method shown in FIG. 2A and FIG. 2B according to an embodiment of the present invention, where another access control scheme is illustrated in the upper half of FIG. 3 for better comprehension.

FIG. 3 illustrates, in the lower half thereof, an access control scheme of the method shown in FIG. 2A and FIG. 2B according to an embodiment of the present invention, where another access control scheme is illustrated in the upper half of FIG. 3 for better comprehension. In the access control scheme shown in the upper half of FIG. 3, all of the spare blocks have been erased, and therefore are blank blocks having no data. As none of the spare blocks is an invalid block having valid data, no valid data can be obtained from any of the spare blocks. During a random read test such as that mentioned above, when two read requests of reading data at the same logical address are received almost at the same time, waiting for completion of the first received request among these two read requests is needed, since there is no other way to obtain the data from the only NV memory element storing this data before the only NV memory element storing this data leaves the busy status thereof.

In the access control scheme shown in the lower half of FIG. 3, a portion of spare blocks (e.g. most spare blocks) among the plurality of spare blocks mentioned above have not been erased, and therefore are invalid blocks respectively having valid data. As each spare block of this portion of spare blocks is an invalid block having valid data, the memory controller 110 (e.g. the microprocessor 112) can obtain the valid data from this portion of spare blocks when there is a need. During a random read test such as that mentioned above, when two read requests of reading data at the same logical address, such as the first read request and the second read request respectively indicating reading at the first logical address LAdd1(j), are received almost at the same time, the memory controller 110 (e.g. the microprocessor 112) can read the valid data from the any destination block (e.g. the destination block mentioned in Step S11) such as one of the plurality of data blocks and read the valid data from the associated source block (e.g. the source block mentioned in Step S11) such as one of the plurality of invalid blocks according to the aforementioned at least one L2P address mapping table (e.g. the L2P table TBL'), to return the valid data at the first logical address LAdd1(j) to the host device 50 in response to the first read request and the second read request respectively, having no need to wait for completion of the first received request (e.g. the first read request) among these two read requests.

Please note that during the garbage collection procedure mentioned above, the memory controller 110 (e.g. the microprocessor 112) can prevent immediately erasing the source block after completion of reading the valid data from the source block and writing the valid data of the source block into the destination block to be the valid data of the destination block, and keep the source block as a member of the plurality of spare blocks without erasing it and keep the associated physical addresses of all valid data therein as the additional physical address information, to make the source block be an invalid block having all valid data being readable, for being read when there is a need. In addition, based on the aforementioned at least one predetermined rule, the memory controller 110 (e.g. the microprocessor 112) can erase the source block after the completion of reading the valid data from the source block and writing the valid data of the source block into the destination block to be the valid data of the destination block. The aforementioned at least one predetermined rule may comprise triggering erasing the source block in response to the blank block count being less than the predetermined blank block count threshold, where the blank block count may indicate a number of one or more spare blocks available for performing programing. For example, by setting the predetermined blank block count threshold as a small value, such as a predetermined value (e.g. one) that is much smaller than the predetermined invalid block count threshold (e.g. ten or above) or much smaller than the predetermined spare block count threshold (e.g. eleven or above), the memory controller 110 (e.g. the microprocessor 112) can maintain the blank block count to be as small as possible most of the time, to keep more invalid blocks without erasing them and keep more valid data thereof to be readable, for being read when there is a need. As the predetermined blank block count threshold may be set as the small value such as one, the plurality of blank blocks mentioned above may be replaced with at least one blank block to cover the case of a single blank block. For brevity, similar descriptions for this embodiment are not repeated in detail here.

Figure 4:
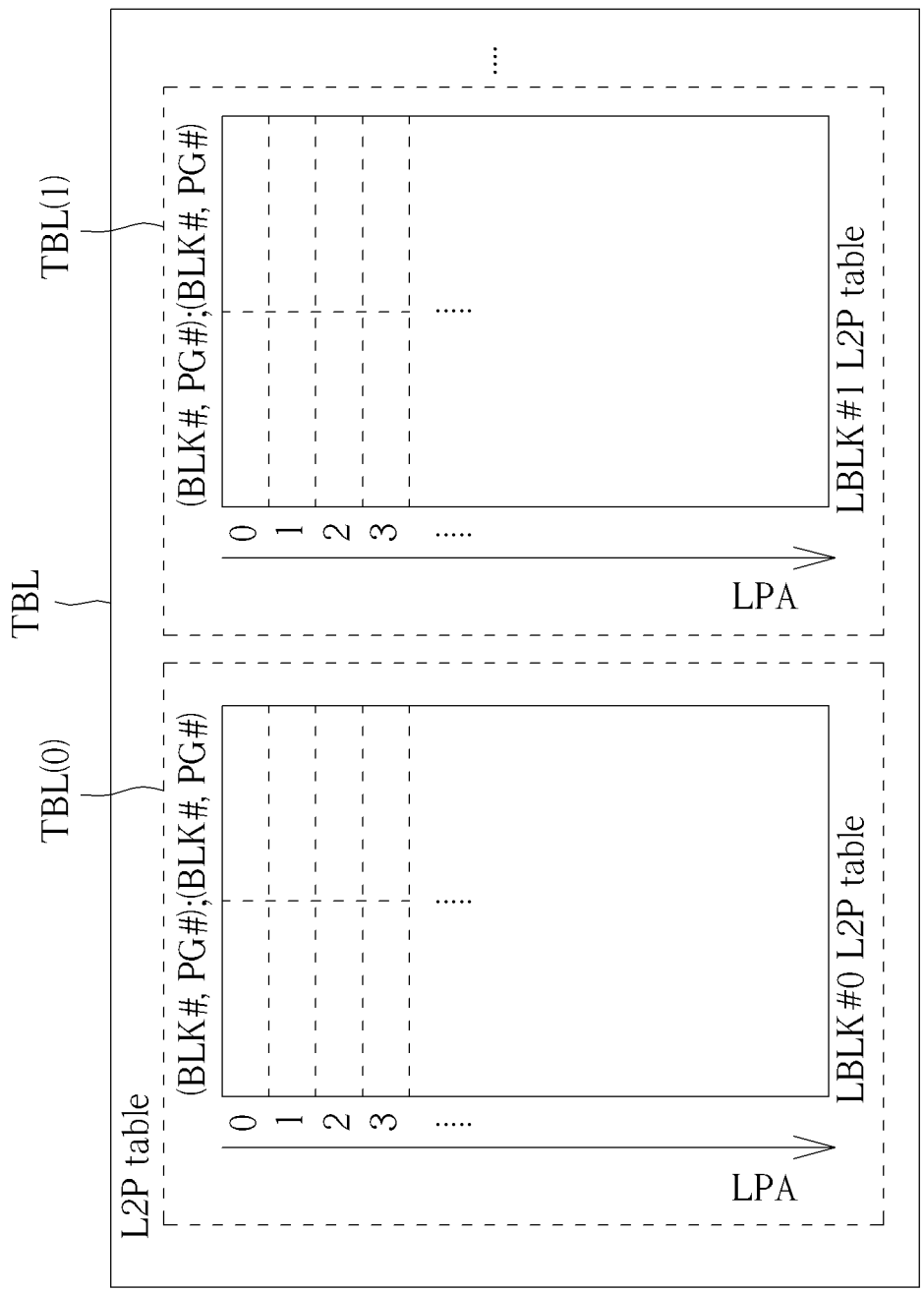
FIG. 4 illustrates a logical-to-physical (L2P) address mapping control scheme of the method shown in FIG. 2A and FIG. 2B according to an embodiment of the present invention.

FIG. 4 illustrates a logical-to-physical (L2P) address mapping control scheme of the method shown in FIG. 2A and FIG. 2B according to an embodiment of the present invention. The aforementioned at least one sub-table (e.g. one or more sub-tables) of the L2P table TBL may comprise multiple sub-tables respectively corresponding to multiple logical blocks (LBLKs) #0, #1, etc., such as the LBLK#0 L2P table TBL(0), the LBLK#1 L2P table TBL(1), etc. respectively corresponding to LBLKs #0, #1, etc.

As shown in FIG. 4, the index of any L2P table corresponding to a certain LBLK among the LBLK#0 L2P table TBL(0), the LBLK#1 L2P table TBL(1), etc. can be a logical page address (LPA) for indicating a logical page in this LBLK. As a logical address may comprise a logical block address (LBA) for indicating this LBLK (e.g. the LBLK comprising this logical page) and the LPA for indicating this logical page, the memory controller 110 (e.g. the microprocessor 112) can perform address mapping on the logical address according to the L2P table TBL (e.g. a sub-table thereof, such as the any L2P table corresponding to this LBLK), to obtain at least one physical address (e.g. one or more physical addresses) associated with this logical address. For example, in the operation of Step S12, the aforementioned at least one physical address may comprise the first physical address PAdd1(i) associated with the first logical address LAdd1(i) and the second physical address PAdd2(i) associated with the first logical address LAdd1(i). For another example, in the operations of Steps S17B and S19B, the aforementioned at least one physical address may comprise the latest physical address (e.g. the second physical address PAdd2(j) associated with the first logical address LAdd1(j), such as the second physical address PAdd2(i0)) and the additional physical address (e.g. the first physical address PAdd1(j) associated with the first logical address LAdd1(j), such as the first physical address PAdd1(i0)).

For better comprehension, any entry (e.g. each entry) of multiple entries in the any L2P table corresponding to this LBLK may comprise multiple fields such as two fields {(BLK#, PG#); (BLK#, PG#)} for respectively recording two physical addresses, where the symbols "BLK#" and "PG#" may stand for block number and page number. For example, in the two fields {(BLK#, PG#); (BLK#, PG#)}, a physical address (BLK#, PG#) may comprise a physical block address (e.g. the block number BLK#) for indicating a certain physical block and a physical page address (e.g. the page number) for indicating a certain physical page in this physical block, any non-used field among all fields of the any L2P table corresponding to this LBLK may carry a predetermined value indicating a non-used status (e.g. a default value indicating a null location), but the present invention is not limited thereto. For brevity, similar descriptions for this embodiment are not repeated in detail here.

Figure 5:
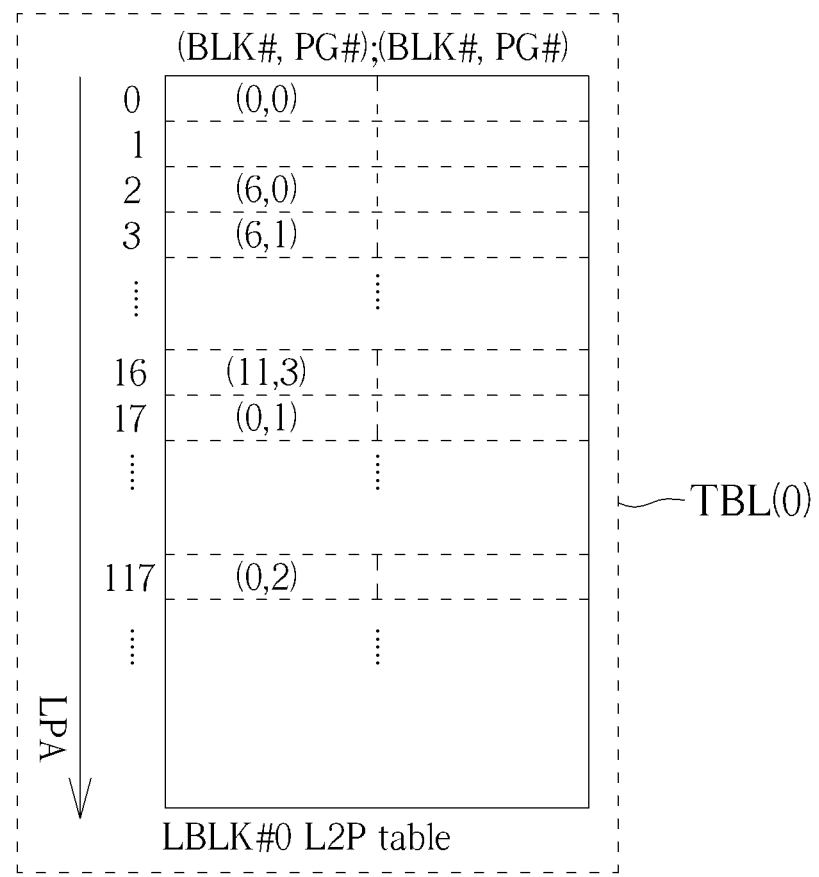
FIG. 5 illustrates some physical addresses recorded based on the L2P address mapping control scheme shown in FIG. 4 according to an embodiment of the present invention.

FIG. 5 illustrates some physical addresses recorded based on the L2P address mapping control scheme shown in FIG. 4 according to an embodiment of the present invention. The LBLK#0 L2P table TBL(0) can be taken as an example of the any L2P table mentioned above. After performing some writing operations, the memory controller 110 (e.g. the microprocessor 112) may have updated the LBLK#0 L2P table TBL(0) to record some physical addresses (0, 0), (6, 0), (6, 1), (11, 3), (0, 1), (0, 2), etc. respectively associated with the logical addresses (0, 0), (0, 2), (0, 3), (0, 16), (0, 17), (0, 117), etc., where these logical addresses may have a format of (LBA, LPA), but the present invention is not limited thereto. For brevity, similar descriptions for this embodiment are not repeated in detail here.

FIG. 6 illustrates some physical addresses recorded based on the L2P address mapping control scheme shown in FIG. 4 according to another embodiment of the present invention. The LBLK#0 L2P table TBL(0) can still be taken as an example of the any L2P table mentioned above. After performing an additional writing operation, the memory controller 110 (e.g. the microprocessor 112) may have updated the LBLK#0 L2P table TBL(0) to record another physical address (256, 0) associated with the logical address (0, 2), where the logical address (0, 2) can be taken as an example of the first logical address LAdd1(i) mentioned in Step S12, and the physical address (6, 0) and the physical address (256, 0) that are associated with the logical address (0, 2) can be taken as examples of the first physical address PAdd1(i) and the second physical address PAdd2(i) that are associated with the first logical address LAdd1(i), respectively, but the present invention is not limited thereto. For brevity, similar descriptions for this embodiment are not repeated in detail here.

FIG. 7 illustrates some physical addresses recorded based on the L2P address mapping control scheme shown in FIG. 4 according to yet another embodiment of the present invention. The LBLK#0 L2P table TBL(0) can still be taken as an example of the any L2P table mentioned above. After performing some other writing operations, the memory controller 110 (e.g. the microprocessor 112) may have updated the LBLK#0 L2P table TBL(0) to record some physical addresses (256, 1), (256, 17), etc. respectively associated with the logical addresses (0, 16), (0, 1117), etc., where the logical address (0, 16) can be taken as an example of the first logical address LAdd1(i) mentioned in Step S12, and the physical address (11, 3) and the physical address (256, 1) that are associated with the logical address (0, 16) can be taken as examples of the first physical address PAdd1(i) and the second physical address PAdd2(i) that are associated with the first logical address LAdd1(i), respectively, but the present invention is not limited thereto. For brevity, similar descriptions for this embodiment are not repeated in detail here.

According to some embodiments, when the source block is erased in the operation of Step S18A, the memory controller 110 (e.g. the microprocessor 112) can update the aforementioned at least one L2P address mapping table, and more particularly, perform the following operations:

(1) using the latest physical address (e.g. the physical address of the destination block) to replace the additional physical address (e.g. the physical address of the source block); and (2) using the predetermined value indicating the non-used status (e.g. the default value) to replace the latest physical address (e.g. the physical address of the destination block). For example, when the source block such as the physical block BLK#6 is erased in the operation of Step S18A, the memory controller 110 (e.g. the microprocessor 112) can remove the physical address (6, 0), and more particularly, move the physical address (256, 0) leftward to replace the physical address (6, 0), where the second field that is previously used for storing the physical address (256, 0) can be filled with the default value. For another example, when the source block such as the physical block BLK#11 is erased in the operation of Step S18A, the memory controller 110 (e.g. the microprocessor 112) can remove the physical address (11, 3), and more particularly, move the physical address (256, 1) leftward to replace the physical address (11, 3), where the second field that is previously used for storing the physical address (256, 1) can be filled with the default value. For brevity, similar descriptions for these embodiments are not repeated in detail here.

Figure 8:
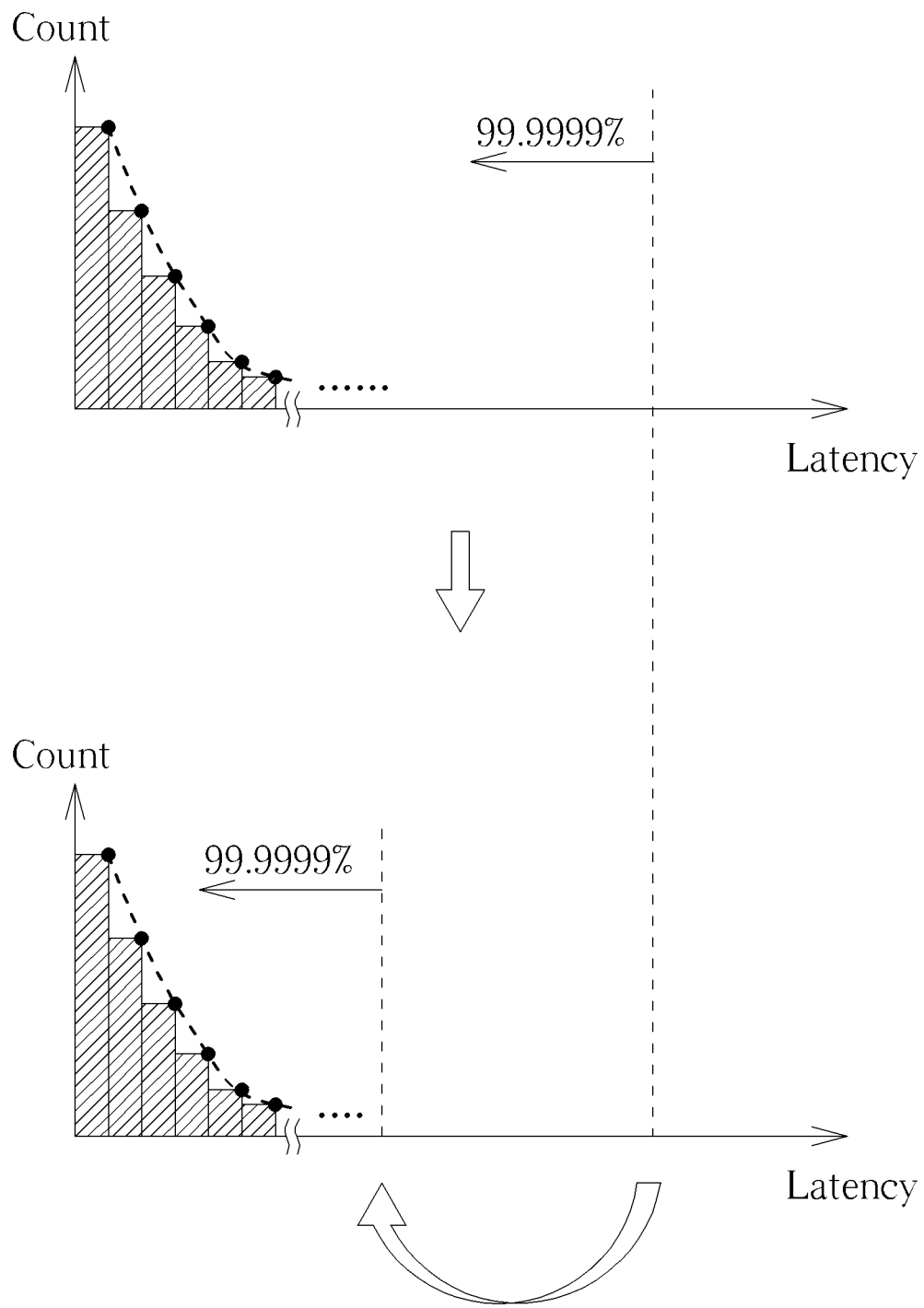
FIG. 8 illustrates improvement regarding a ratio of the number of timely completed read commands to a total number of read commands during a random read test according to an embodiment of the present invention.

FIG. 8 illustrates improvement regarding a ratio of the number of timely completed read commands to a total number of read commands during a random read test according to an embodiment of the present invention. In any of the two cases respectively shown in the upper half and the lower half of FIG. 8, the horizontal axis may represent the read latency (labeled "Latency" for brevity) such as a total execution time of a read command, and the vertical axis may represent the read command count (labeled "Count" for brevity) such as the number of read commands, where a read busy time of a Flash memory die may be used as a unit for measuring the read latency, and may be referred to as "tR" for brevity. In addition, a histogram may be generated according to the respective counts of (1 * tR), (2 * tR), (3 * tR), etc. to indicate the relationships between the read command count and the read latency, and a curve depicted with a dashed line may indicate a trend of the relationships between the read command count and the read latency, but the present invention is not limited thereto.

For example, a high capacity architecture having a number of Flash memory dies may have been managed via multiple channels, to try reducing the impact of read collision. When it is required that the ratio of the number of timely completed read commands (e.g. the read commands that are respectively completed within a predetermined multiple of the read busy time tR) to the total number of read commands during the random read test should reach a predetermined threshold such as an enterprise-class threshold (e.g. 99.9999%) to pass the random read test, the issue of read collision may become much more severe for a higher capacity architecture having a greater number of Flash memory dies. The method shown in FIG. 2A and FIG. 2B and the associated apparatus such as the architecture shown in FIG. 1 (e.g. the memory device 100, and more particularly, the memory controller 110 therein) can ensure real-time response from the memory device 100 to the host device 50, and therefore can improve the overall performance.

For better comprehension, assume that the ratio corresponding to the access control scheme shown in the upper half of FIG. 3 can reach the predetermined threshold such as the enterprise-class threshold (e.g. 99.9999%) to pass the random read test as illustrated in the upper half of FIG. 8. The ratio corresponding to the access control scheme shown in the lower half of FIG. 3 can reach a much higher threshold (e.g. 99.99999%) to pass the random read test as illustrated in the lower half of FIG. 8, since the distribution of the histogram can be compressed leftward to make 99.9999% of the distribution become below a lower multiple of the read busy time tR. For brevity, similar descriptions for this embodiment are not repeated in detail here.

According to some embodiments, the memory controller 110 (e.g. the microprocessor 112) can trigger the garbage collection procedure after performing a series of operations, and the series of operations may comprise:

(1) receiving at least one first write request from the host device 50, where the at least one first write request may indicate writing first data at multiple logical addresses within a logical address range, respectively, and the first logical address is one of the multiple logical addresses;

(2) in response to the at least one first write request, performing programing on the first physical block within the first NV memory element 122-n1;

(3) receiving at least one second write request from the host device 50, where the at least one second write request may indicate writing second data at one or more logical addresses among the multiple logical addresses, and the first logical address is none of the one or more logical addresses; and (4) in response to the at least one second write request, performing programing on the first physical block within the first NV memory element 122-n1, where the first data stored in the first physical block becomes invalid data;

but the invention is not limited thereto. In addition, writing the second data at the one or more logical addresses among the multiple logical addresses may make first partial data of the first data become invalid data, and remaining partial data of the first data may comprise the valid data of the source block. The memory controller 110 (e.g. the microprocessor 112) can collect invalid data existence information and/or invalid data amount information of the first physical block, to detect that the first physical block is suitable for be used as the source block of the garbage collection procedure. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing access control of a memory device with aid of additional physical address information, the method being applied to a controller of the memory device, the memory device comprising the controller and a non-volatile (NV) memory, the NV memory comprising a plurality of NV memory elements, the method comprising:

during a garbage collection procedure, reading valid data from a source block and writing the valid data of the source block into a destination block to be valid data of the destination block, wherein the source block and the destination block represent a first physical block within a first NV memory element of the plurality of NV memory elements and a second physical block within a second NV memory element of the plurality of NV memory elements, respectively;

updating at least one logical-to-physical (L2P) address mapping table to make the at least one L2P address mapping table comprise both of a first physical address associated with a first logical address and a second physical address associated with the first logical address, wherein the first physical address indicates where the valid data of the source block is stored within the first physical block, and the second physical address indicates where the valid data of the destination block is stored within the second physical block;

receiving a first read request from a host device, wherein the first read request indicates reading at the first logical address;

in response to the first read request, reading the valid data of the destination block according to the second physical address associated with the first logical address;

receiving a second read request from the host device, wherein the second read request indicates reading at the first logical address; and in response to the second read request, reading the valid data of the source block according to the first physical address associated with the first logical address.

2. The method of claim 1, further comprising:

during the garbage collection procedure, preventing immediately erasing the source block after completion of reading the valid data from the source block and writing the valid data of the source block into the destination block to be the valid data of the destination block.

3. The method of claim 1, further comprising:

based on at least one predetermined rule, erasing the source block after completion of reading the valid data from the source block and writing the valid data of the source block into the destination block to be the valid data of the destination block.

4. The method of claim 3, wherein the at least one predetermined rule comprises triggering erasing the source block in response to a blank block count being less than a predetermined blank block count threshold, wherein the blank block count indicates a number of one or more spare blocks available for performing programing.

5. The method of claim 1, wherein erasing the source block occurs after completion of reading the valid data of the source block in response to the second read request.

6. The method of claim 1, wherein the source block is recorded as an invalid block on an invalid block management table, for being erased based on at least one predetermined rule.

7. The method of claim 1, wherein the garbage collection procedure is triggered after a series of operations, wherein the series of operations comprise:

receiving at least one first write request from the host device, wherein the at least one first write request indicates writing first data at multiple logical addresses within a logical address range, respectively, and the first logical address is one of the multiple logical addresses;

in response to the at least one first write request, performing programing on the first physical block within the first NV memory element;

receiving at least one second write request from the host device, wherein the at least one second write request indicates writing second data at one or more logical addresses among the multiple logical addresses, and the first logical address is none of the one or more logical addresses; and in response to the at least one second write request, performing programing on the first physical block within the first NV memory element, wherein the first data stored in the first physical block becomes invalid data.

8. The method of claim 7, wherein writing the second data at the one or more logical addresses among the multiple logical addresses makes first partial data of the first data become invalid data, and remaining partial data of the first data comprises the valid data of the source block.

9. A memory device, comprising:

a non-volatile (NV) memory, configured to store information, wherein the NV memory comprises a plurality of NV memory elements; and a controller, coupled to the NV memory, configured to control operations of the memory device, wherein the controller comprises:

a processing circuit, configured to control the controller according to a plurality of host commands from a host device, to allow the host device to access the NV memory through the controller;

wherein:

during a garbage collection procedure, the controller reads valid data from a source block and writes the valid data of the source block into a destination block to be valid data of the destination block, wherein the source block and the destination block represent a first physical block within a first NV memory element of the plurality of NV memory elements and a second physical block within a second NV memory element of the plurality of NV memory elements, respectively;

the controller updates at least one logical-to-physical (L2P) address mapping table to make the at least one L2P address mapping table comprise both of a first physical address associated with a first logical address and a second physical address associated with the first logical address, wherein the first physical address indicates where the valid data of the source block is stored within the first physical block, and the second physical address indicates where the valid data of the destination block is stored within the second physical block;

the controller receives a first read request from the host device, wherein the first read request indicates reading at the first logical address, and the first read request comprises a first read command among the plurality of host commands;

in response to the first read request, the controller reads the valid data of the destination block according to the second physical address associated with the first logical address;

the controller receives a second read request from the host device, wherein the second read request indicates reading at the first logical address, and the second read request comprises a second read command among the plurality of host commands; and in response to the second read request, the controller reads the valid data of the source block according to the first physical address associated with the first logical address.

10. The memory device of claim 9, wherein the at least one L2P address mapping table is stored in the NV memory; and the controller further comprises:

a random access memory (RAM), configured to store information, wherein the RAM comprises a table region for storing a temporary L2P address mapping table, and the temporary L2P address mapping table represents a temporary version of at least one portion of the at least one L2P address mapping table stored in the NV memory.

11. A controller of a memory device, the memory device comprising the controller and a non-volatile (NV) memory, the NV memory comprising a plurality of NV memory elements, the controller comprising:

a processing circuit, configured to control the controller according to a plurality of host commands from a host device, to allow the host device to access the NV memory through the controller;

wherein:

during a garbage collection procedure, the controller reads valid data from a source block and writes the valid data of the source block into a destination block to be valid data of the destination block, wherein the source block and the destination block represent a first physical block within a first NV memory element of the plurality of NV memory elements and a second physical block within a second NV memory element of the plurality of NV memory elements, respectively;

the controller updates at least one logical-to-physical (L2P) address mapping table to make the at least one L2P address mapping table comprise both of a first physical address associated with a first logical address and a second physical address associated with the first logical address, wherein the first physical address indicates where the valid data of the source block is stored within the first physical block, and the second physical address indicates where the valid data of the destination block is stored within the second physical block;

the controller receives a first read request from the host device, wherein the first read request indicates reading at the first logical address, and the first read request comprises a first read command among the plurality of host commands;

in response to the first read request, the controller reads the valid data of the destination block according to the second physical address associated with the first logical address;

the controller receives a second read request from the host device, wherein the second read request indicates reading at the first logical address, and the second read request comprises a second read command among the plurality of host commands; and in response to the second read request, the controller reads the valid data of the source block according to the first physical address associated with the first logical address.

\* \* \* \* \*